United States Patent [19]
Basu et al.

[11] Patent Number: 5,597,399
[45] Date of Patent: Jan. 28, 1997

[54] SOIL ENHANCING COMPOUND AND METHOD FOR PRODUCING SAME

[76] Inventors: Dibyendu Basu; Susan M. Basu, both of 526 Jean Lafitte, Baton Rouge, La. 70810

[21] Appl. No.: 507,877

[22] Filed: Jul. 27, 1995

Related U.S. Application Data

[63] Continuation-in-part of Ser. No. 55,846, Apr. 30, 1993, abandoned.
[51] Int. Cl.⁶ ............................................. C05F 5/00
[52] U.S. Cl. .................................. 71/9; 71/903
[58] Field of Search ........................ 423/555; 71/9, 71/12, 23, 903

[56] References Cited

U.S. PATENT DOCUMENTS

| | | | |
|---|---|---|---|
| 4,056,380 | 11/1977 | Thiac | 71/9 |
| 4,421,731 | 12/1983 | Palmer et al. | 423/555 |
| 4,743,287 | 5/1988 | Robinson | 71/12 |
| 5,100,455 | 3/1992 | Pinckard et al. | 71/9 |
| 5,158,594 | 10/1992 | Oxford | 71/25 |

*Primary Examiner*—Ferris Lander
*Attorney, Agent, or Firm*—Warner J. Delaune

[57] ABSTRACT

A method for producing a soil enhancing compound is provided, comprising the steps of mechanically mixing a portion of composted agricultural waste consisting essentially of plant by-products, with a portion of bio-solid waste consisting essentially of sludge from waste water treatment, to form an organic compost mixture, and mechanically mixing with the organic compost mixture, a portion of industrial waste consisting essentially of calcium sulfate and phosphorous to form a final soil enhancing mixture, wherein a gelatinous, nutrient-containing substance is formed within the soil enhancing mixture by the interaction of the composted agricultural waste and the industrial waste. Alternatively, the agricultural waste can be used alone with the industrial waste. Either the agricultural waste, the bio-solids or the industrial waste may be acidic or alkaline, as long as the final soil enhancing mixture has a pH of between 6.0 and 7.5. If the radioactivity of the industrial waste exceeds permissible levels, the proportions of the other components in the final compound can be increased to dilute the radioactivity of the soil enhancing compound to acceptable levels.

3 Claims, 1 Drawing Sheet

5,597,399

SOIL ENHANCING COMPOUND AND METHOD FOR PRODUCING SAME

RELATION TO APPLICATION

This application is a continuation-in-part of application Ser. No. 08/055,846, filed Apr. 30, 1993 and now abandoned.

BACKGROUND OF THE INVENTION

I. Field of the Invention

The present invention relates generally to soil enhancing compounds, and more particularly to those soil enhancing compounds which employ phosphogypsum and similar industrial by-products as a source of phosphorous, as well as the method for producing such compounds.

II. Description of the Prior Art

The disposal of waste products in general is an ever-increasing worldwide concern. Public demand and government regulations have called for safer and more effective storage and disposal of these wastes. Nearly all production processes, including agricultural and industrial processes, and municipal water treatment, produce waste by-products.

The production of chemicals is a long practiced and still growing industry in Louisiana. As with almost every industrial process, both acidic and alkaline by-products are generated. In the industrial corridor on the Mississippi River between Baton Rouge and New Orleans, there exist numerous chemical plants and stock piles of waste products. One specific and seriously polluting type of waste is a by-product created in the production of phosphate fertilizers and phosphoric acid. The common process for extracting phosphate is known as the "wet acid process". Phosphate-containing rocks, composed mostly of calcium phosphate, are exposed to water and sulfuric acid yielding phosphoric acid and phosphogypsum. For each ton of phosphoric acid produced by the wet acid process, there are approximately five (5) tons of phosphogypsum produced. This acidic waste, referred to as phosphogypsum slurry, with a typical pH of 2 to 3, is pumped into large piles. The storage of this phosphogypsum causes many environmental problems, and the present method of storing has several disadvantages. First, the natural flow of rain water through the material may create acid runoff and accidental contamination of ground water. Second, phosphogypsum is inherently radioactive, depending upon the type of rock used and the location from which the rock was mined. As a result, phosphogypsum typically contains approximately 25 picocuries of radium-226 per gram (pCi/gram) or higher. Moreover, radon gas, released as part of the normal radium decay process, has become the major radionuclide cause for concern. EPA regulations currently state that for handling phosphogypsum, the average concentration of radium-226 shall not exceed 10 pCi/gram of substance handled.

The industrial response to these ever-growing stockpiles of phosphogypsum has been to devote increasing funds toward research in storage of the materials. If it is stored for long enough periods of time, e.g. about 400 years, the radioactive material will simply decay to a point when it is no longer dangerous to handle. However, such continued use of these methods prevents the industries from realizing the potential uses and benefits of phosphogypsum, as well as similar wastes which contain calcium sulfate and phosphorous, in other applications. New methods and products are needed which capitalize on the recoverable elements within these industrial by-products in a way that minimizes most of the concerns surrounding the radioactivity of the waste.

Southern Louisiana is also a leader in the production of sugar cane, rice and other crops, thus creating considerable quantities of agricultural by-products. Examples of such by-products are bagasse, rice hulls, corn husks, and cotton gin waste. As is the case of the industrial waste just described, the prevailing method of disposal is stockpiling. Many of these stockpiles are unmanaged and also represent a source of surface water pollution. When appreciable quantities of runoff from these agricultural by-products are left to enter lakes, streams, and other bodies of water, the biochemical oxygen demand (BOD) on the aquaculture can result in the loss of valuable plant and animal resources. Despite these hazards, such materials, when processed properly, can greatly benefit the environment when used in combination with other chemicals.

A third by-product produced in large quantities, in nearly all communities, is municipal waste water treatment residue. During the process of water and waste water treatment, there is usually an alkaline residue created as a result of the filtration process. This is referred to in the industry as waste sludge or "bio-solids" and often comprises the used filter cakes formed on the treatment filters during filtration. In many cases, these bio-solids require costly methods of disposal, such as through landfills and incineration. What is needed is a way of combining all of the above-described waste materials into a safe and usable product that can actually enhance the environment, rather than damage it through inadequate methods of disposal.

SUMMARY OF THE INVENTION

It is therefore an object of this invention to provide a process which results in the economic and environmentally safe disposal of industrial, agricultural, and municipal waste products.

It is also an object of the present invention to provide an alternative use for phosphogypsum.

Another object of the present invention is to provide an environmentally safe and useful product which is created from the mixture and treatment of such waste products.

Yet another object of the present invention is to provide a soil conditioner for commercial agricultural use, home gardening, and landscaping.

These and other objects and advantages of the present invention will no doubt become apparent to those skilled in the art after having read the following description of the preferred embodiment.

Therefore, a method for producing a soil enhancing compound is provided, comprising the steps of mechanically mixing a portion of composted agricultural waste consisting essentially of plant by-products, with a portion of bio-solid waste consisting essentially of sludge from waste water treatment, to form an organic compost mixture, and mechanically mixing with said organic compost mixture, a portion of industrial waste consisting essentially of calcium sulfate and phosphorous to form a final soil enhancing mixture; wherein a gelatinous, nutrient-containing substance is formed within said soil enhancing mixture by the interaction of said composted agricultural waste and said industrial waste. Alternatively, the agricultural waste can be used alone with the industrial waste to produce substantially the same results. Either the agricultural waste, the bio-solids or the industrial waste may be acidic or alkaline, as long as the final soil enhancing mixture has a pH of between 6.0 and 7.5.

In the case of an overly acidic compound, alkaline substances such as time can be added to reach the desired pH. If the radioactivity of the industrial waste (prior to mixing) exceeds permissible levels, the proportions of the other components in the final compound can simply be increased to dilute the radioactivity of the soil enhancing compound to acceptable levels.

DETAILED DESCRIPTION OF THE INVENTION

Figure 1:
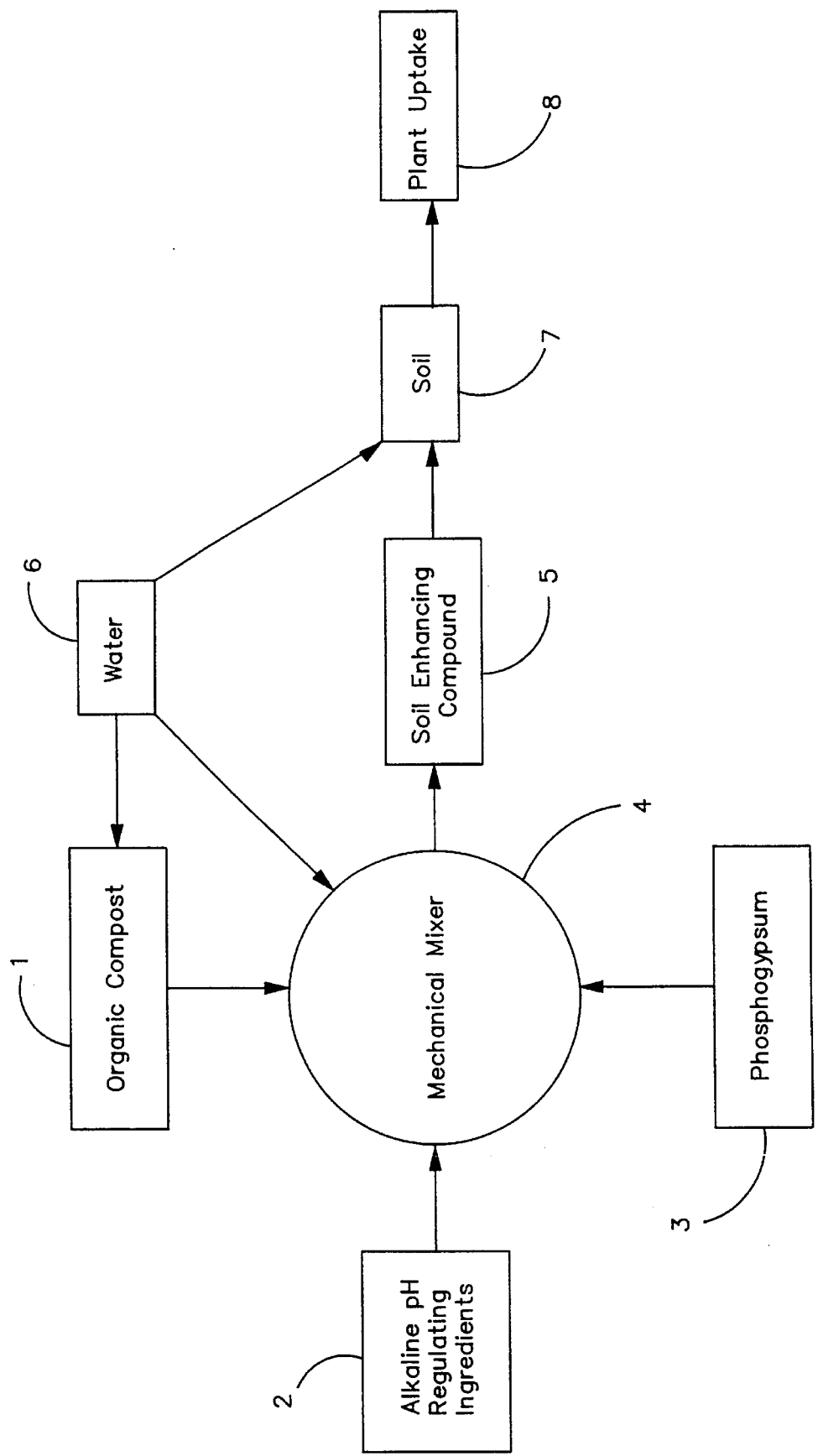
FIG. 1 is a flow diagram depicting the process of making and using the soil enhancing compound of the present invention.

The present invention is a process by which composted agricultural wastes, and optionally, bio-solids (preferably alkaline municipal or industrial waste) are combined with industrial wastes (preferably acidic) to produce an effective soil enhancer. The first step in the process is the composting of the agricultural by-products 1 and placement into a mechanical mixer 4, as shown in FIG. 1. One of the major components of the compost 1 may be bagasse, a sugar cane by-product which is very plentiful near sugar refineries. During the production of sugar, sugar cane is crushed, and the juice obtained therefrom is passed through a filter. The filter mesh retains the organic solids, such as the ground-up fibrous portions of the cane. The resulting filter "cake" is rich in organic matter and is an excellent source for conversion into organic soil conditioner with fertilizing properties once it is properly composted. Rice hulls and/or other food and fiber crop wastes may also be composted and used either in place of the bagasse or in addition to it to obtain the inventive soil enhancing compound with equal effectiveness. The actual method of composting used is irrelevant. Many methods for composting these agricultural by-products are known to those of ordinary skill, so the particular method used is not relied upon herein as a point of novelty.

During the composting process, alkaline pH regulating ingredients such as bio-solids 2 (such as from municipal or industrial treated sewerage from waste water treatment facilities) are added to the mechanical mixer 4, as shown in FIG. 1. It is important that the bio-solids or sludge preferably be treated by an alkaline process to remove substantially all pathogens which are harmful to humans prior to use in this mixture. The alkaline bio-solids 2 can be substantially any alkaline product which, when mixed with the acidic waste 3 (to be described below) yields a mixture having a pH of approximately 6.5 to 7.0. The pH of the bio-solids 2 will typically range from 7.5 to 12.5, depending upon the source. Through experimentation, bio-solids 2 have been found to be particularly well-suited for this inventive process. It should be noted that the present invention, although preferred, does not require the bio-solids 2 to have an alkaline pH, because the key reason for including them is for their plant-nutritive elements rather than for the specific pH. Moreover, the bio-solids 2 can actually be deleted from the list of reactants if desired, because the compost 1 will often provide most of the nutrients to the plants in the soil. If the final soil enhancing compound is too acidic, either because of the absence of these bio-solids 2 or because the alkalinity is too low, alkaline substances such as lime or lime slurry can be added to achieve the desired pH of the final compound.

The final step in the production of the soil enhancing compound 5 is the addition and blending in the mechanical mixer 4 of selected acidic industrial wastes 3 with the previous mixture of bio-solids 2 and composted agricultural waste 1 (hereinafter the "alkaline compost mixture"). In a preferred embodiment of the invention, acidic industrial wastes 3 containing calcium sulfate (such as phosphogypsum) are blended with the alkaline compost mixture in granular form. Acidic industrial waste 3 suitable for this present invention preferably contains a mixture of anhydrite calcium sulfate ($CaSO_4$) and gypsum ($CaSO_4 2H_2O$). The calcium sulfate content of the waste is preferably greater than 25% by weight, but less than 100% by weight to allow for adequate gypsum content (for aeration purposes), depending upon the solids present, and has a pH in the range of 1.0 to 5.0. This waste may be derived by a number of industrial processes, so the pH of the acid waste will depend on the source, such as from the various methods used to produce phosphoric acid. The key advantages derived from the granular phosphogypsum are its characteristics as a good soil aeration substance (like gypsum, as is well known in the art) and its provision of phosphorous. Substantially any waste containing calcium sulfate and phosphorous can be used with the alkaline compost mixture in order to produce the soil enhancing compound which is a part of the present invention. It should further be noted that even if the industrial waste 3 is not acidic (although preferred), it is nonetheless useful in this invention if it contains phosphorous and calcium sulfate. The acidity or the alkalinity of any of the aforementioned substances is not critical to the invention, but such pH values represent what appear to be the most abundant types of waste available in practicing the invention, and which are most in need of alternative, environmentally safe uses.

The acidic industrial waste 3 (typically phosphogypsum as just described) is blended at the rate of 20% to 60%, by weight of the final compound, with the alkaline compost mixture at the rate of 40% to 80%, by weight. Depending on the actual pH of the acidic industrial waste 3, and the actual pH of the alkaline compost mixture used, the relative amounts of these components in the final soil enhancing compound 5 should be adjusted in order to yield an overall pH of 6.0 to 7.5, given a constant radioactivity of the final compound 5 of 10 pCi/gram or less. However, prior to being combined with the alkaline compost mixture, the concentration of radium-226 in the phosphogypsum can typically range between 15 and 29 pCi/gram. If industrial waste other than phosphogypsum is used, the radioactivity of the waste can range roughly from 0–35 pCi/gram. Undesirably, higher radioactivity levels tend to force the use of lesser amounts of the calcium sulfate- and phosphorous-containing waste. A suitable ratio between the alkaline compost mixture and the phosphogypsum can thus reduce the concentration of radium-226 in the final soil enhancing compound to a more acceptable radiation level of 10 pCi/gram or below. Depending upon applicable state or federal laws governing the handling of radioactive materials, this ratio can, of course, be adjusted so that the effective amount of dilution of the radioactive phosphogypsum can be achieved. Inert materials (acidic or alkaline) can be added as needed to adjust the final pH depending on the acid or alkaline nature of the waste ingredients.

In addition to the advantages listed above, the soil enhancing compound 5 described herein is beneficial to plant growth for the following reasons. Certain constituents in the phosphogypsum chemically react and bind with the inherent moisture of the alkaline compost mixture to produce a gelatinous, flocculating substance. The formation of this gelatinous substance increases with the addition of moisture, such as water 6, and it becomes more capable of delivering micronutrients to the plants as the pH of the final soil enhancing mixture increases to neutralization, or pH 7. For example, calcium sulfate is produced at a pH of about 1.0, while calcium phosphate, aluminum phosphate, ferric phosphate, and magnesium phosphate are produced at a pH of about 1.0–3.0. Finally, the creation of calcium hydro-phosphate occurs at a pH range of about 3.0–7.0. All of the foregoing compounds are thus present within the gelatinous medium at neutral pH levels. Advantageously, the establishment of this gelatinous medium uniquely aids in the retention of moisture and clings to surrounding surfaces. Furthermore, it ensures a consistent blend of agriculturally beneficial ingredients by preventing the phosphogypsum from separating from the compost mixture. This gelatinous medium also prevents the phosphogypsum from gravitating into layers of higher radioactive concentration.

While the foregoing effects will typically be achieved within appropriate pre-use mixing facilities, those effects are further enhanced upon placement of the final compound into the soil. As water 6 from rain and other irrigation sources is added to the newly enriched soil 7, the reactions continue and more moisture is collected and stored within the nutrient-containing gelatinous formations. The gelatinous matter attaches itself to the roots of plants 8, thus facilitating the absorption of available nutrients in the compost and phosphogypsum. Moreover, such desirable effects are achieved in addition to the ability of the gypsum to aerate the soil 7 and allow the soil 7 to release excessive moisture, thus permitting healthier root formation and plant growth 8.

Although the use of composting, in general, is common in the many horticultural environments, the present invention improves upon the use of compost as a soil enhancer by the addition of the phosphorous in the phosphogypsum and through the drainage-enhancing properties of the phosphogypsum. The present invention can be used in a wide variety of agricultural and horticultural applications, including, but not limited to, food and fiber crops, landscaping and ornamental gardens, lawns, golf courses and potting materials. It will renew the soil fertility by the application of organic matter, reduce the need for irrigation water requirements because of the ability of the compost and gelatinous matter to hold water, and enhance aeration and drainage properties of the soil. The addition of organic matter to the phosphorus-rich phosphogypsum enhances the soil's ability to transfer the phosphorous to the plant by binding with the nutrients in the soil and by slowly making them available to the plant systems, as the plant requires, thus reducing the use of chemical fertilizers. The precise amount of the compound which should be used in a particular soil environment will depend on a number of factors, such as the amount of clay in the soil, moisture content, the age of the soil, and past uses of the soil. Therefore, it is left to the person practicing the invention to make such determinations based on the needs of the situation, although it is believed that even small amounts will enhance the soil through increased nutrient delivery and aeration.

The exact ratios of each of the aforementioned components in the soil enhancing compound will depend highly upon the exact nature of these components and their specific properties. Persons of ordinary skill in the art will appreciate that the proper pH and the concentration of essential plant nutrients can be adjusted to suit the individual needs of the soil. In any case, however, the addition of the phosphogypsum, or waste having similar plant-nutritive properties, has been recognized by the inventors herein as a critical and important advancement in the enhancement of soil. This invention will result in a product that has sufficient nutrients, humus and aeration qualities, to enhance most agricultural and gardening productivity. Likewise, it provides a heretofore unconsidered means of alleviating the growing concerns over the accumulation of municipal, industrial and agricultural waste. Thus, the present invention will be further illustrated by the following non-limiting example.

EXAMPLE 1

A soil conditioner was prepared by blending in an appropriate container organic compost (prepared from bagasse retrieved from a local sugar refinery) having the following properties (all percentages are by weight):

Organic Matter: 42%

Moisture Content: 32% pH: 7.0

Primary Nutrients: 2% Nitrogen; 2% Phosphorus; 3% Potassium

Secondary Nutrients: 0.6% Sulphur; 0.6% Magnesium; 4% Calcium; 0.15% Sodium

Trace Elements: 0.5% Iron; 820 ppm (parts per million) Manganese; 21 ppm Zinc; 72 ppm Copper; 20 ppm Boron; 2.3 ppm Molybdenum at the rate of 2 parts organic compost to 3 parts bio-solids (obtained from a local waste water treatment plant), with the bio-solids having the following properties:

Organic matter: 30%

Moisture Content: 32% pH: 10.0

Primary Nutrients: 0.2% Nitrogen; 0.9% Phosphate; 1% Potassium

Recalcitrant Materials: 33% (non-organic material, including silica, and minerals)

Total Trace Levels of Contaminants 500 ppm Arsenic; 75 ppm Beryllium; 100 ppm Cadmium; 2500 ppm Chromium; 8000 ppm Cobalt; 2500 ppm Copper; 1000 ppm Lead; 20 ppm Mercury; 2000 ppm Nickel; 100 ppm Selenium; 500 ppm Silver; 5000 ppm Zinc. This alkaline compost mixture was then combined at the ratio of 2 parts alkaline compost mixture to 1 part phosphogypsum, with the phosphogypsum having the following properties:

Primary Nutrients: 1.0 % Phosphate

Moisture Content: 19% pH: 4.0

Other Compounds: 32.5% Calcium Oxide; 44% Sulfite; 0.5% Ferric Oxide; 1.2% Fluorine and sand Radioactivity: Radium-226 at 19 pCi/gram This final mixture is ready to use almost immediately, because only minimal reaction time (typically less than one hour) is needed in order to achieve the proper pH. The resulting compound is a soil enhancer having the following properties:

Organic Matter: 23%

Moisture Content: 27% pH: 6.9

Primary Nutrients: 0.6% Nitrogen; 1.2% Phosphorus; 0.8% Potassium

Secondary Nutrients: 14% Sulphur; 0.2% Magnesium; 10% Calcium; 0.16% Iron; 0.1% Sodium Trace Elements: 39 ppm Copper; 24 ppm Zinc; 5 ppm Boron; 1.6 ppm Chromium; 4.84 ppm Lead; 1.35 ppm Nickel Radioactivity: Radium-226 at 7 pCi/gram Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

We claim:

1. A method for producing a soil enhancing compound, comprising:

(a) mechanically mixing a portion of composted agricultural waste consisting essentially of plant by-products with a portion of phosphogypsum, said phophogypsum having about 1% phosphate by weight and at least 25% calcium sulfate by weight, to form an intermediate mixture, wherein said composted agricultural waste comprises about 40% to 80% by weight of said intermediate mixture and wherein said phophogypsum comprises 20% to 60% by weight of said intermediate mixture;

(b) adding an amount of water to said intermediate mixture effective to cause the formation of a nutrient-containing gelatin within said intermediate mixture by the interaction of said water, said composted agricultural waste, and said phosphogypsum;

(c) adding an amount of a pH regulating ingredient to said intermediate mixture effective to create a pH of between 6.0 and 7.5 in said intermediate mixture; and (d) adjusting the amount of said composted agricultural waste in said intermediate mixture to form a soil enhancing compound having a radioactivity of 10 pCi/gram or less.

2. The method according to claim 1, wherein said plant by-products in said composted agricultural waste are selected from the group consisting of bagasse, rice hulls, corn husks, and cotton gin waste.

3. A composition of matter for the enhancement of soil, prepared by a process comprising the steps of:

(a) mechanically mixing a portion of composted agricultural waste consisting essentially of plant by-products with a portion of phosphogypsum, said phosphogypsum having about 1% phosphate by weight and at least 25% calcium sulfate by weight, to form an intermediate mixture, wherein said composted agricultural waste comprises about 40% to 80% by weight of said intermediate mixture and wherein said phophogypsum comprises 20% to 60% by weight of said intermediate mixture;

(b) adding an amount of water to said intermediate mixture effective to cause the formation of a nutrient-containing gelatin within said intermediate mixture by the interaction of said water, said composted agricultural waste, and said phosphogypsum;

(c) adding an amount of a pH regulating ingredient to said intermediate mixture effective to create a pH of between 6.0 and 7.5 in said intermediate mixture; and (d) adjusting the amount of said composted agricultural waste in said intermediate mixture to form a soil enhancing compound having a radioactivity of 10 pCi/gram or less.

* * * * *